United States Patent
Chia et al.

(10) Patent No.: US 6,693,599 B1
(45) Date of Patent: Feb. 17, 2004

(54) RF TRANSPONDER

(75) Inventors: Michael Yan Wah Chia, Singapore (SG); Chip Hong Ang, Singapore (SG); Daryl Lee Song Cher, Singapore (SG); We Peng Jason Ng, Singapore (SG)

(73) Assignee: National University of Singapore (SG)

( * ) Notice: Subject to any disclaimer, the term of this patent is extended or adjusted under 35 U.S.C. 154(b) by 0 days.

(21) Appl. No.: 09/936,125

(22) PCT Filed: Feb. 29, 2000

(86) PCT No.: PCT/GB00/00709

§ 371 (c)(1),
(2), (4) Date: Feb. 13, 2002

(87) PCT Pub. No.: WO00/64004

PCT Pub. Date: Oct. 26, 2000

(30) Foreign Application Priority Data

Apr. 16, 1999 (SG) .............................................. 9902217

(51) Int. Cl.⁷ ............................................. H01Q 11/12
(52) U.S. Cl. ...................... 343/741; 343/866; 340/505; 363/61
(58) Field of Search .................. 343/700 MS, 741, 343/742, 743, 744, 797, 866, 867, 868; 340/505, 572.5; 363/21.14, 60, 61; H01Q 11/12

(56) References Cited

U.S. PATENT DOCUMENTS

| | | | | | |
|---|---|---|---|---|---|
| 5,432,518 | A | * | 7/1995 | van Erven | 342/42 |
| 5,691,731 | A | * | 11/1997 | van Erven | 343/742 |
| 5,838,254 | A | * | 11/1998 | Kokubu et al. | 340/10.34 |
| 6,154,380 | A | * | 11/2000 | Assow et al. | 363/61 |
| 6,272,031 | B1 | * | 8/2001 | Shona | 363/89 |
| 6,480,099 | B1 | * | 11/2002 | Ziegler | 340/10.1 |

* cited by examiner

*Primary Examiner*—Tho Phan
(74) *Attorney, Agent, or Firm*—Ipsolon LLP (57) ABSTRACT

An RF transponder having an antenna comprising at least two ports operable to receive signals such that, in use, the signals in combination establish at least two current nulls on the antenna, each of the ports being located substantially at a current null.

21 Claims, 9 Drawing Sheets

PRIOR ART

FIG 5

PRIOR ART

RF TRANSPONDER

TECHNICAL FIELD

THIS INVENTION relates to an RF transponder having an antenna and, more particularly, to an RF transponder having an antenna comprising at least two ports.

BACKGROUND

For certain applications, a two-way radio frequency (RF) communications system might comprise a number of transponders and a reader. The transponders have no direct power source and operate using radiated power from the reader. Hence, this type of arrangement is known as 'passive tagging'. Initially, the reader sends out a carrier wave, which may be a continuous wave (CW) or a pulse wave (PW), the purpose of which is to provide a radiated power source for the transponders and to interrogate the transponders as to a specific identification code (ID) carried by each transponder in its internal processor. The reader receives a backscattered version of its own carrier wave. The carrier wave is modified by the identification code such that the information carried by the carrier wave includes the identification of an interrogated transponder, thus allowing the reader to identify the transponder. Once this has been done, the reader establishes a protocol for communication between itself and the transponder. This communication takes the form of the reader sending a digitally modulated control signal which the transponder demodulates.

The transponder has three tasks. These are to rectify AC power derived from the carrier wave, to modulate the backscattered response to the initial carrier wave and to demodulate the control signal from the reader. The transponder has an antenna. If all of these functions were to be carried out using the same antenna and by a shared port of the antenna it would be very difficult to achieve optimum performance as different parameters are required for each of the functions to perform optimally.

SUMMARY OF THE INVENTION

Improved performance can be achieved by using two ports on the same antenna, where one port is for the modulator and demodulator, and the other solely for the rectifier. Thus, either at least two antennae are required, or a single antenna with multiple ports is needed.

If two antennae are used, the so-called dual-antenna solution (as is the case with most of the current work in this area), problems arise due to the small size of the transponders. The two antennae need to be isolated from each other (ideally half of a signal wavelength apart) in order not to interfere with each other, and on a transponder of limited size it is often not possible to place the antennae sufficiently far apart (see FIGS. 5 & 6 of the accompanying drawings). This approach thus leads to an oversized transponder, and can also reduce the space available for other components.

Another solution is to use a single antenna with dual ports. However, for good antenna gain performance, a good quality substrate is required, which increases the cost of producing the transponder. Known antennae using this approach incorporate microstrip patch antennae with dual ports, and operate these ports at the same frequency. The antenna gain performance of such a setup using a good quality substrate is not perturbed by microstrip transmission line power feed due to the nature of the electromagnetic fields in the microstrip patch.

It is an object of the invention to seek to provide an RF transponder having an antenna which incorporates a plurality of ports, without requiring the use of an expensive substrate, and without incurring significant loss of gain performance for any of the ports.

Accordingly, one aspect of the invention provides an RF transponder having an antenna comprising at least two ports operable to receive respective signals such that, in use, the signals in combination establish at least two current nulls on the antenna, each of the ports being located substantially at a current null.

Advantageously, the antenna is a loop.

This loop, preferably, is formed as a coplanar structure.

Conveniently, the antenna loop is rectangular.

Advantageously, the number of current nulls is two.

Preferably, the length of the perimeter of the antenna is substantially equal to two or more half wavelengths of at least one of the signals.

Conveniently, the signals are 90° out of phase with each other.

Advantageously, coplanar stripline is provided for feeding the signals to the antenna.

Preferably, the antenna has two ports.

A further problem which dictates the minimum size of conventional passive transponders is that the magnitude of the demodulated signal is not. sufficient to be read by digital circuits on the transponder. Comparators, which are relatively large and consume substantial amounts of power, are required to boost the demodulated signal, and this increases the size and the power consumption of the transponder.

It is a further object of the present invention to provide a rectifying circuit which can output a demodulated signal of sufficient magnitude to be read directly by conventional digital circuits.

Accordingly, A further aspect of the present invention provides a rectifying circuit containing two ports, each port being operable to have an oscillating voltage applied thereacross, a first rectifying means being connected to the first port and being constructed such that, in operation, the output of the first rectifying means is substantially constant and a second rectifying means being connected to the second port and being constructed such that, in operation, the output of the second rectifying means fluctuates in phase with the applied voltage.

Preferably, the rectifying circuit has an output comprising the outputs of the first and second rectifying means combined with one another.

Conveniently, the outputs of the first and second rectifying means are combined by summation.

Advantageously, the combined output is bridged by a DC storage capacitor to provide a DC power source.

Preferably, the first rectifying means performs a voltage multiplication effect.

Conveniently, the second rectifying means performs a voltage multiplication effect.

Advantageously, the first rectifying means comprises first and second diodes and first and second capacitors, the capacitance of the second capacitor being sufficiently large to provide a smoothing effect that, in operation, renders the output of the first rectifying means approximately constant.

Preferably, the second rectifying means comprises third and fourth diodes and third and fourth capacitors, the capacitance of the fourth capacitor being sufficiently small that, in operation, the output of the second rectifying means fluctuates in phase with the applied oscillating voltage.

Another aspect of the invention provides an RF transponder including a rectifying circuit according to the above, in which the combined output of the first and second rectifying means comprises a demodulated signal for the transponder and the output is further bridged by a DC storage capacitor to provide a DC power source for the transponder.

BRIEF DESCRIPTION OF THE DRAWINGS

In order that the invention may be more readily understood, an embodiment thereof will now be described, by way of example, with reference to the accompanying drawings, in which:

FIG. 15 shows the waveforms produced by the circuit of FIG. 14.

DETAILED DESCRIPTION

Figure 1:
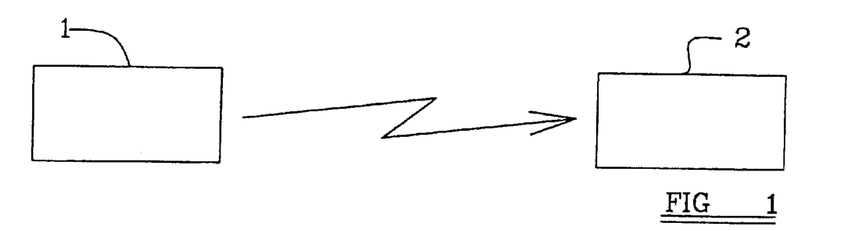
FIG. 1 is a diagrammatic representation of the a first stage of communication between a reader and a passive RF transponder, in which the reader is emitting a carrier wave.
Figure 2:
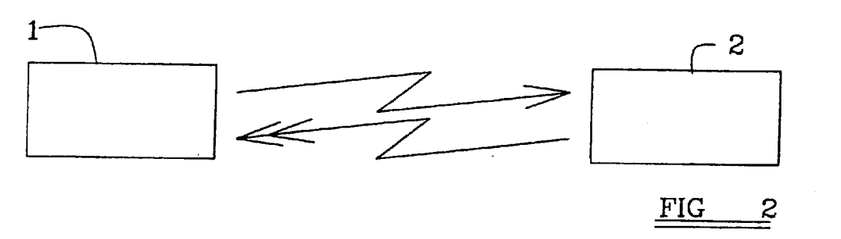
FIG. 2 is a diagrammatic representation of a second stage of communication between the reader and the transponder of FIG. 1, in which the reader it still emitting the carrier wave, and the transponder is emitting a modulated version of the carrier wave.
Figure 3:
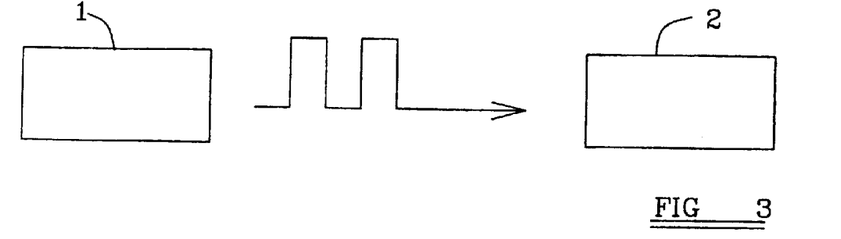
FIG. 3 is a diagrammatic representation of a third and final stage of communication between the reader and the transponder of FIG. 1, in which the reader emits a digitally modulated control signal.

Referring to FIG. 1, this is a block diagram representing a first stage of communication between a reader 1 and a passive RF transponder 2, wherein the reader 1 emits a radio frequency carrier wave. FIG. 2 represents a second stage of communication between the reader 1 and the transponder 2, in which the reader 1 is still emitting the carrier wave, and the transponder 2 is emitting a modulated version of the carrier wave. FIG. 3 shows the third and final stage of communication, in which the reader 1 emits a digitally modulated control signal.

Figure 4:
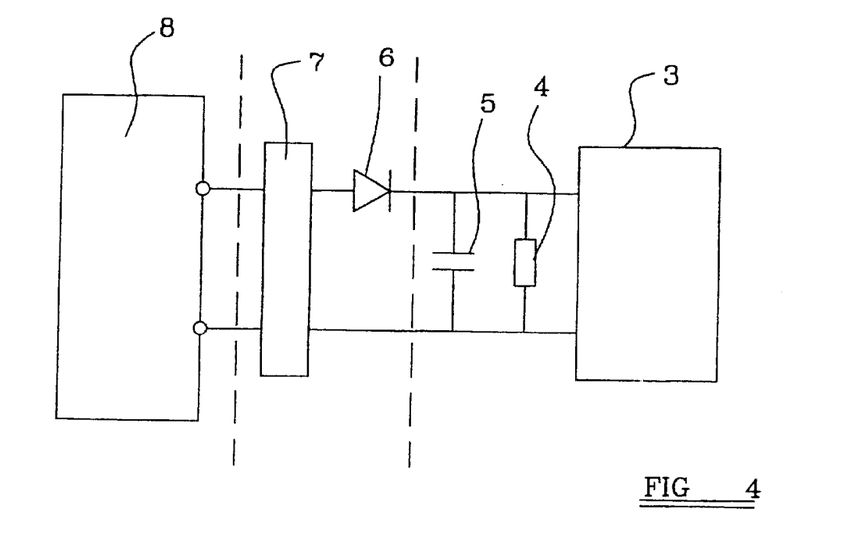
FIG. 4 is a circuit diagram of an RF transponder embodying the present invention.

FIG. 4 shows a typical circuit diagram for a passive RF transponder. This circuit comprises: a processor 3 having a memory in which an identification code is stored specific to the transponder. The processor 3 is connected in parallel to, in order, a resistor 4, a capacitor 5, a matching circuit 7 and a loop antenna 8. A diode 6 forms part of one of the connections between the capacitor 5 and the matching circuit 7, which diode allows current to flow from the matching circuit 7 to the capacitor 5 but not in the other direction. The transponder's identification code is modulated on to the carrier wave by controlling the DC load of the diode 6.

Figure 5:
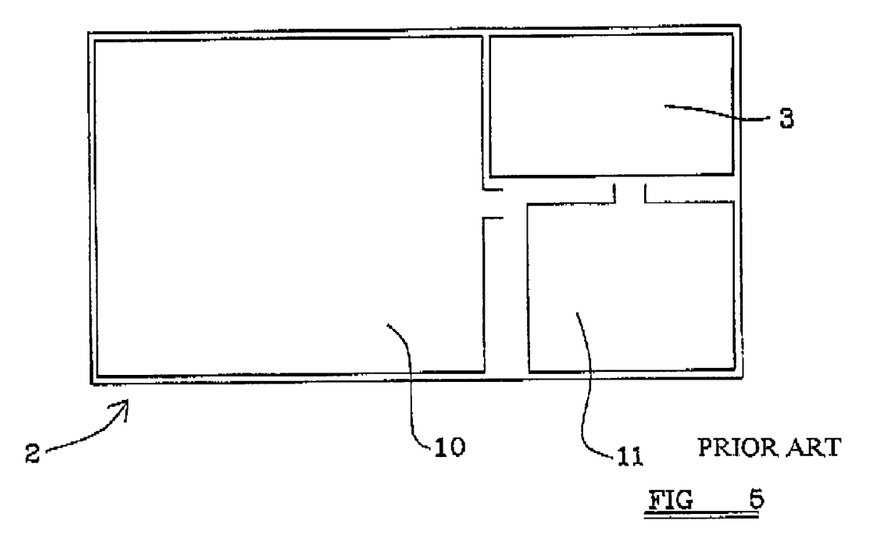
FIG. 5 is a schematic plan view of an arrangement of components on a known RF transponder.
Figure 6:
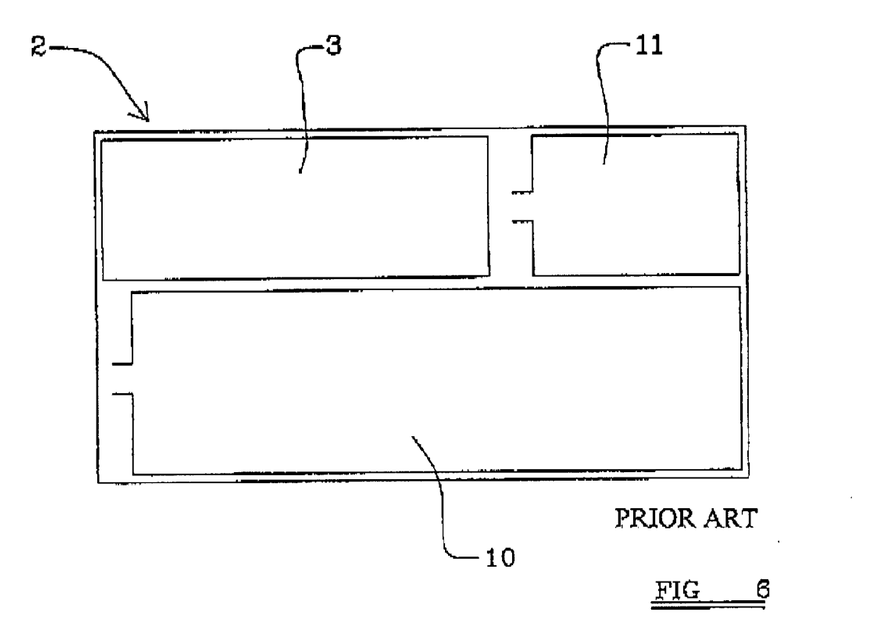
FIG. 6 is a schematic plan view of another arrangement of components on a known RF transponder.

In FIGS. 5 and 6, two known transponder designs are shown, in which each transponder 2 has two separate antennae 10, 11 and a processor 3. One antenna 10 is optimised to receive communication signals from the reader 1 and the other antenna 11 is optimised to act, effectively, as a secondary winding such that an AC current is provided in the antenna 11 by the carrier wave radiated from the reader 1. Such transponder designs suffer from the problem of the two antennae 10, 11 occupying a large amount of the surface area of the transponder, thereby either increasing the size of the transponder 2 or limiting the space available for other components on the transponder 2.

Figure 7:
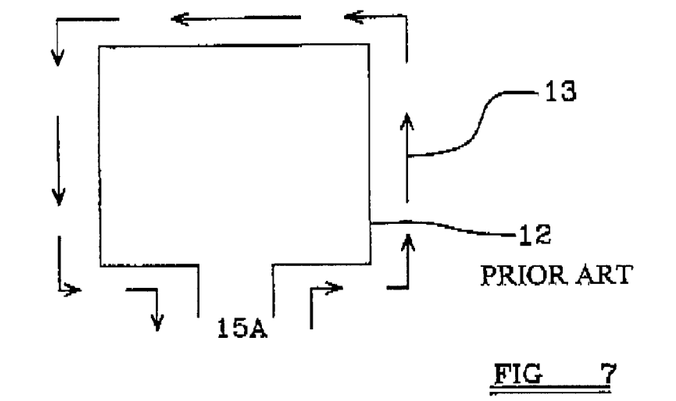
FIG. 7 is a schematic representation of the current flow on the metallic portion of a loop antenna with a single current provided by a signal, the direction of the current flow being indicated by arrows.

FIG. 7 shows an antenna for an RF transponder in the form of a metallic loop 12, of the sort commonly used in radio frequency antennae which is operable to receive a signal. The loop 12 has a single port 15A. The direction of flow of the electric current provided by the signal around the loop 12 is represented by arrows 13. In this case, current flow is in one direction only. The loop 12 of FIG. 7 illustrates the current flow which would occur, in use, in the antennae 10, 11 in the transponders 2 shown in FIGS. 5 and 6.

An embodiment of the invention consists of an RF passive transponder having a dual port coplanar loop antenna for. If the antenna 8 is configured as a single port coplanar antenna, the electric current flows predominantly on the metallic portion of the loop as shown in FIG. 7 to produce a radiation pattern, the antenna having an associated antenna gain.

Figure 9:
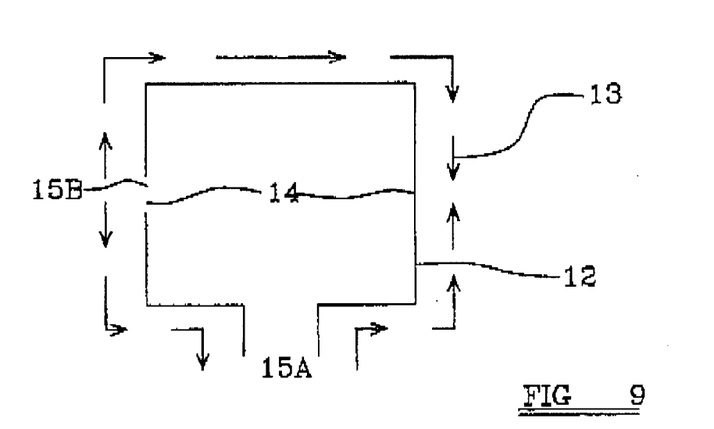
FIG. 9 is a schematic representation of the loop antenna of FIG. 8 provided with a break in the loop.

If a second port 15B is now introduced on this loop 12, as shown in FIG. 9, it creates a break in the loop 12, disturbing the current flow. This would normally reduce the gain of the antenna formed by this loop 12 as the arrangement would then essentially consist of two antennae in close proximity, and the same problems as encountered with the dual antenna solution would arise.

Figure 8:
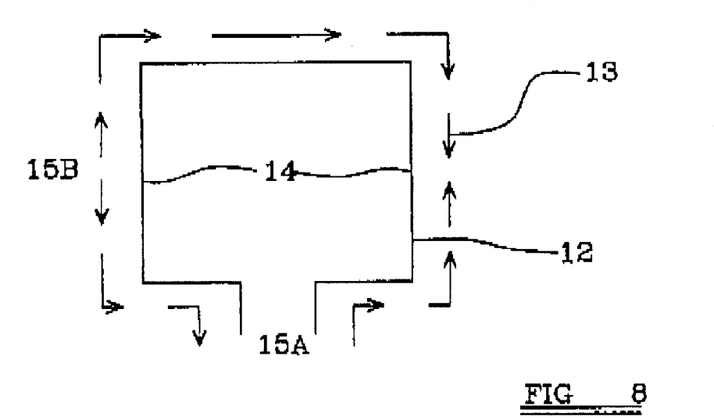
FIG. 8 is a schematic representation of the current flow on the metallic portion of a loop antenna when a second current is provided by a signal in accordance with an embodiment of the invention.

To solve the above problems, embodiments of the invention provide an RF transponder with a relationship of current nulls on the metallic region of the antenna to introduce the second port onto the loop. For example, if two signals are received by the loop 12 as shown in FIG. 8, at respective ports 15A, 15B, and these signals are in a phase relationship, standing waves are created around the loop 12, which will contain current nulls at points 14 around the loop 12 where no charge is flowing. These current nulls are analogous to the stationary points on a resonating wire, and can only be produced when the loop 12 is fed by more than one signal through respective ports 15A, 15B. In this way, the ports 15A, 15B can be positioned at or near the points 14 around the loop 12 where the current nulls exist. In the example of FIG. 9, the second port 15B is located at a break in the loop 12 at or near a point 14 where a current null exists. In this manner, the signals which are received by the loop 12 through the ports 15A, 15B do not have a significant effect on each other compared to the effect caused by a second port which is not located at or near a current null on the loop 12. This dual port antenna design can be applied to any loop antenna to optimise the gain.

Preferably, one of the signal waveforms is the carrier wave from the reader 1 and the other signal waveform is the modulated version of the carrier wave transmitted by the transponder 2.

In the case of a preferred embodiment of the invention, the gain of the main port 15A for the signal is about 4 dBi, and the gain of the second port 15B, used for the other signal comprising, for example, a communication signal, is about 2.5 dBi. A higher gain delivers higher power for the antenna which will therefore be more effective.

The dual ports can also be used in dual polarised transmission in other communication systems in which both signals comprise communication signals. Circular polarisation can be achieved if the two ports are fed 90° out of phase.

Previous attempted solutions using RF transponders with dual port loop structures have been based on microstrip configurations. This has the drawback of requiring high quality substrate which increases the production cost of the structure incorporating the antenna, such as an RF transponder. Further, the ground plane would change its radiation pattern or lobe from an optimal or desired pattern. However, a fundamental difference between such a design and an RF transponder having a coplanar loop embodying the present invention is that the loop structure of the previous design is not changed by the feeds from the two ports, since it is fed by a microstrip which is an unbalanced line. In an embodiment of the invention, a break is created in the loop geometry of the antenna to introduce the second port based on coplanar stripline, which is a balanced transmission line structure. Thus, RF transponders embodying the invention do not need to have the antenna formed using high quality substrates thereby lowering the manufacturing cost of the resultant RF transponders.

Figure 10:
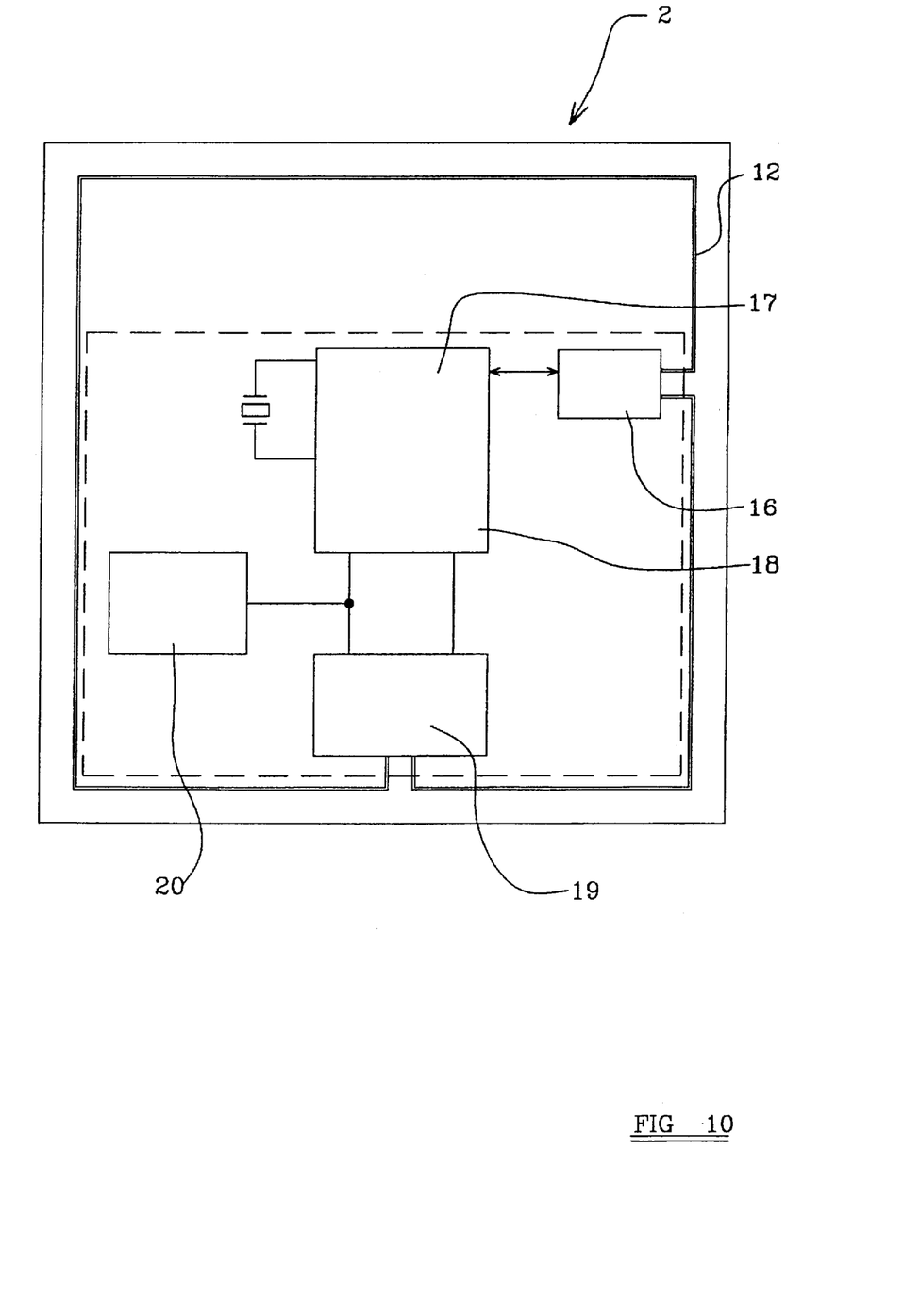
FIG. 10 is a block diagram of an RF passive transponder embodying the present invention.

FIG. 10 shows the major sub-units of an RF passive transponder 2 embodying the present invention and containing a dual port loop antenna, which sub-units act as a communication link with the reader 1. As a consequence of electromagnetic coupling between an antenna at the reader 1 and the transponder antenna 12, the transponder 2 receives a portion of the radiated signal. In the transponder 2, the second port 15B of the loop antenna 12 is connected to a Modulator/Demodulator (modem) circuit 16. The modem circuit 16 is in turn connected to an Input/Output port 17 of a data processing unit such as a baseband processor (e.g. ASIC or microprocessor) 18. The function of the modem 16 is to demodulate the received radiated signal and also modulate the encoded identification information code contained in the data processing unit 18 in a backscattered version through the second port 15B. The main poll 15A of the loop antenna 12 is connected to a rectifier circuit 19, which converts a portion of the received radiated signal into a DC voltage. This DC voltage source is used to supply power to the data processing unit 18. A voltage limiter 20 is added to prevent the oversupply of voltage when the transponder 2 is placed in close proximity to the reader 1.

Figure 11:
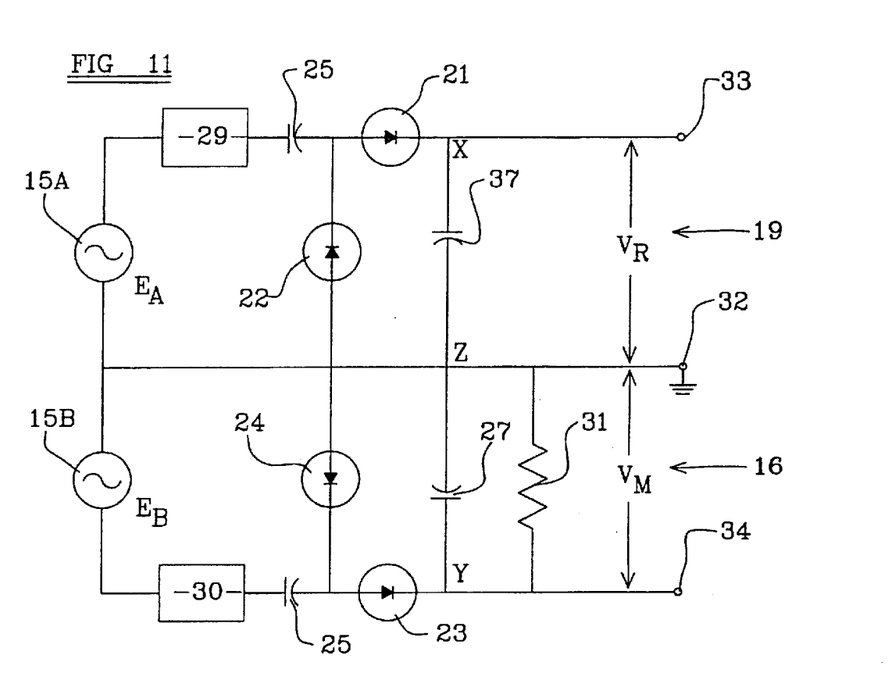
FIG. 11 is a circuit diagram of rectifying and modem circuits for use in an RF transponder embodying the present invention.

FIG. 11 shows in detail a preferred embodiment of the invention in which the DC circuitry of the rectifier circuit 19 and modem circuit 16 are constructed on the dual port loop antenna 12. Due to the geometry of the loop antenna 12, a first port 32, which acts as a ground port in this configuration, is being shared with the rectifier circuit 19 and the modem circuit 16. The rectifier circuit 19 comprises a first matching network 29, a first capacitor 25, first and second microwave diodes 21, 22 and a DC reservoir capacitor (DCR) 37 connected to the main port 15A. The radiated signal received at the main port 15A is shown schematically in FIG. 11 as an AC power source $E_A$. The modem circuit 16 comprises a second matching network 30, a second capacitor 26, third and fourth microwave diodes 23, 24, a third capacitor 27 and a resistor 31 connected to the second port 15B, shown schematically as an AC power source $E_B$. The dimension of the loop antenna 12 is one wavelength. The two ports 15A, 15B are located substantially at current nulls and are a quarter-wavelength apart. Thus, any variations at the port terminals on one of the ports will cause minimal changes to the port impedance of the other port and vice versa. The voltage $E_A$ represents an open circuit RF voltage provided in the loop antenna main port 15A by reception of the radiated signal. A voltage doubler, which is made up of the first capacitor 25, the first and second microwave diodes 21, 22 and the DCR capacitor 37, charges up until its terminal voltage is equal to $V_R$, the voltage between a second terminal 33 and the first terminal 32 (the voltage across XZ). The first matching network 29 can be comprised of a series of inductors or capacitors and is used to match the impedance of tie main port 15A to the dynamic impedance or the voltage doubler so as to achieve maximum power transfer. The value of the second capacitor 22 is chosen to be sufficiently large to smooth the output voltage across XZ and render it substantially constant, this being used as a DC output voltage for use as a power source for the transponder.

Likewise, the voltage $E_B$ represents an open circuit RF voltage provided in the loop antenna second port 15B by reception of the radiated signal. The second capacitor 26, the third and fourth microwave diodes 23, 24, the third capacitor 27 and the resistor 31 perform two functions: that of a voltage doubler and an envelope detector. The time constant of the third capacitor 27 and the resistor 31 is small enough to envelope detect the signal to recover a voltage $V_M$ across the first and second terminals 32, 33. The second matching network 30 performs the same function as the first matching network 29. The value of the fourth capacitor 24 is chosen to be sufficiently small that the fluctuations in the signal received at port 15B are not smoothed out, and the output across YZ is used as demodulated data by downstream logic circuitry in the transponder.

Figure 12A:
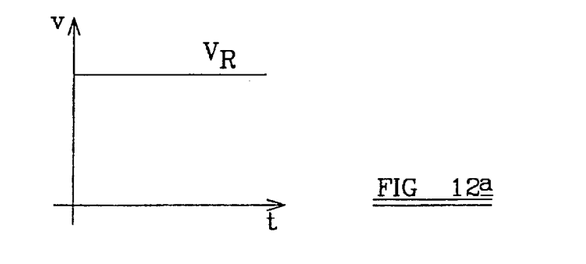
FIGS. 12a–12b shows the waveforms produced by the circuit of FIG. 11.
Figure 12B:
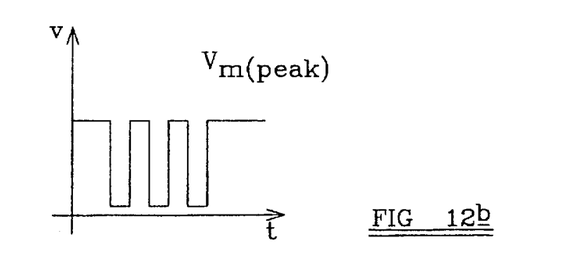

FIG. 12A shows the rectified voltage waveform $V_R$ (the DC output voltage) across the second terminal 33 and the first terminal 32, and FIG. 12B shows the modulated voltage waveform $V_M$ across the third terminal 34 and the first terminal 32.

Thus, in the circuitry of FIGS. 10 and 11, the output of the modem 16 is the demodulated data (the voltage across YZ) and the output of the rectifier 19 is the power supply for the transponder (the voltage across XZ).

Figure 13:
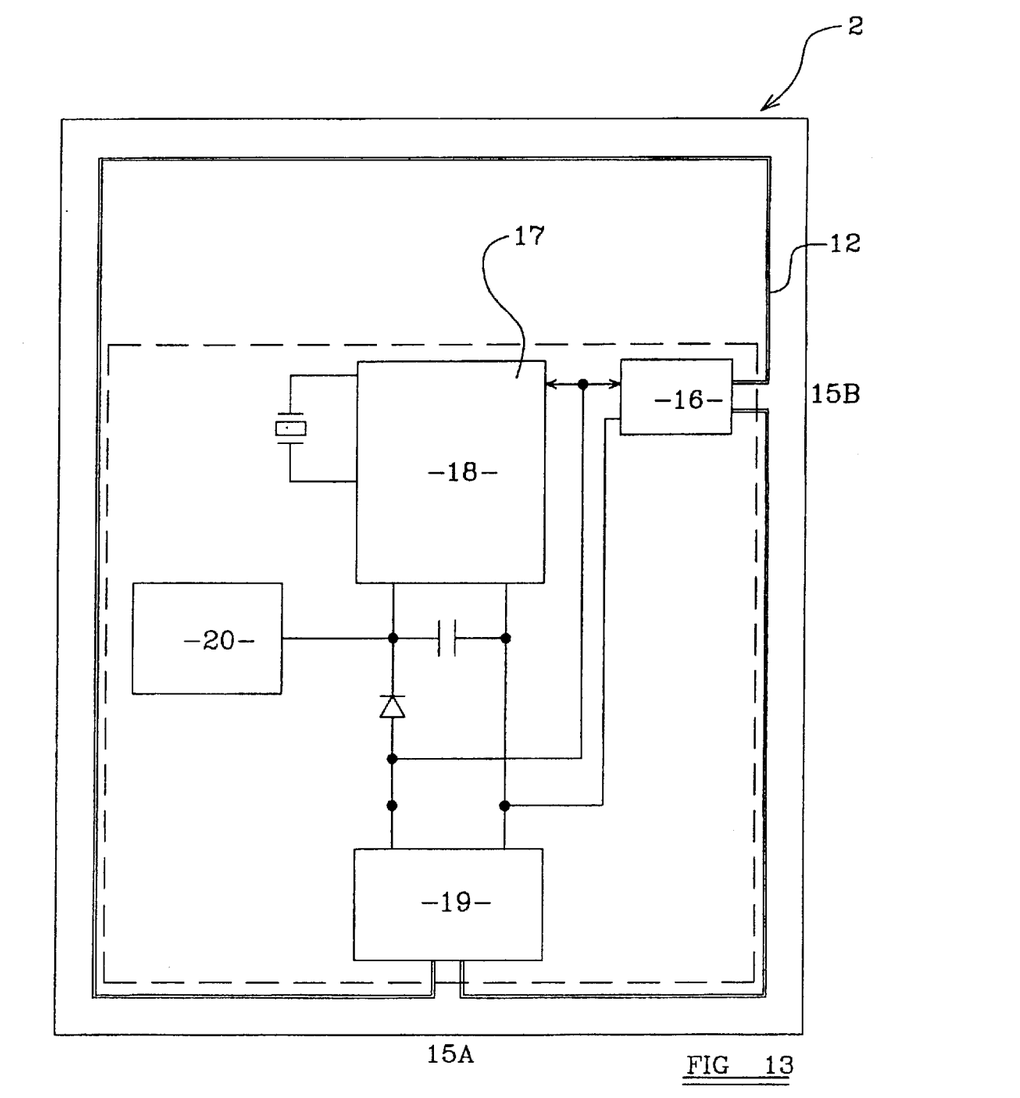
FIG. 13 is a block diagram of an added voltage of an RF passive transponder embodying the present invention.
Figure 14:
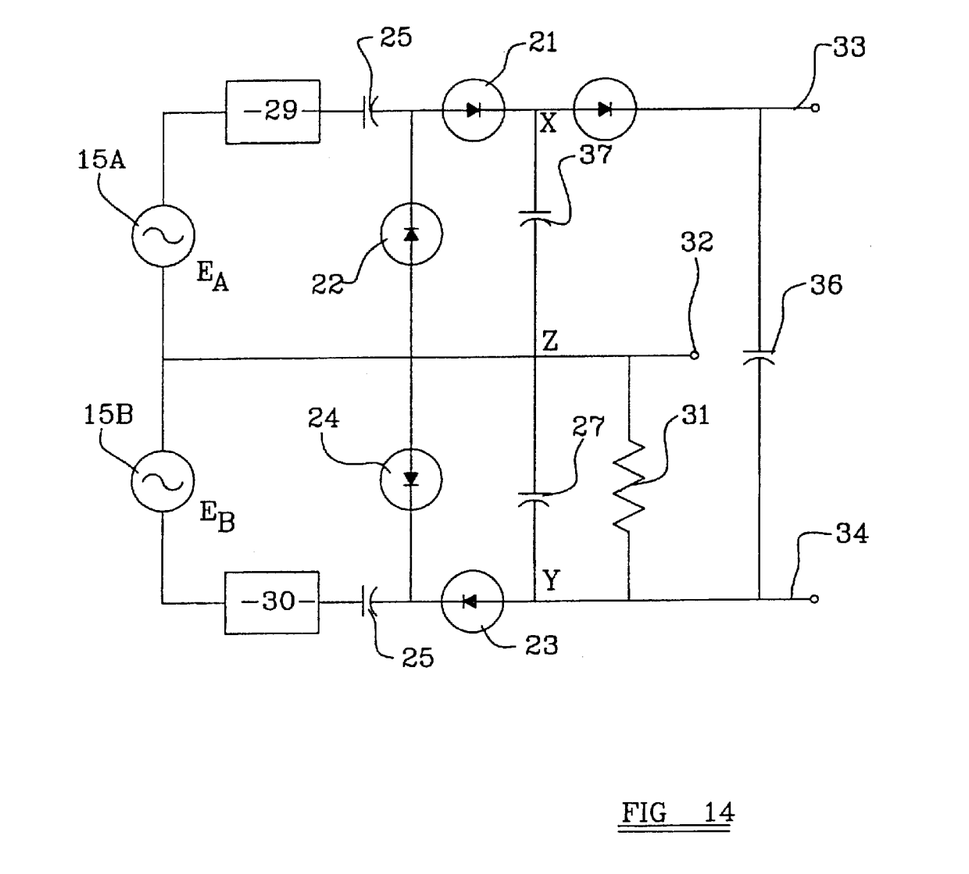
FIG. 14 is a circuit diagram of a superposition of the voltages of the rectifying and modem circuits for use in a RF transponder embodying the present invention.
Figure 15A:
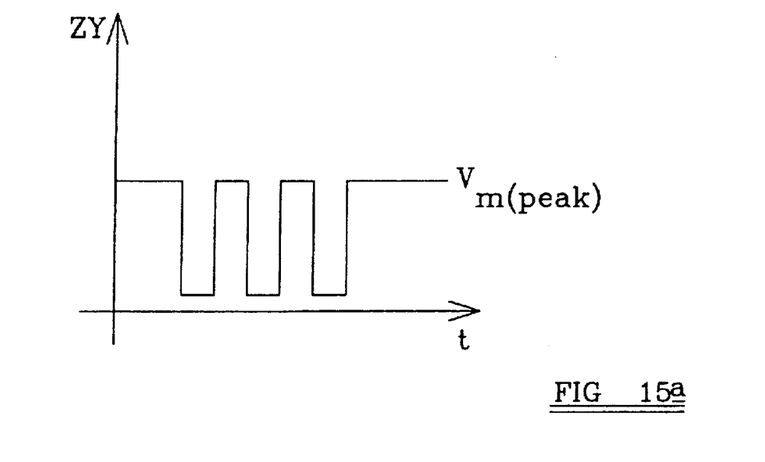
FIGS. 15a–15c shows the waveforms produced by the circuit of FIG. 14.
Figure 15B:
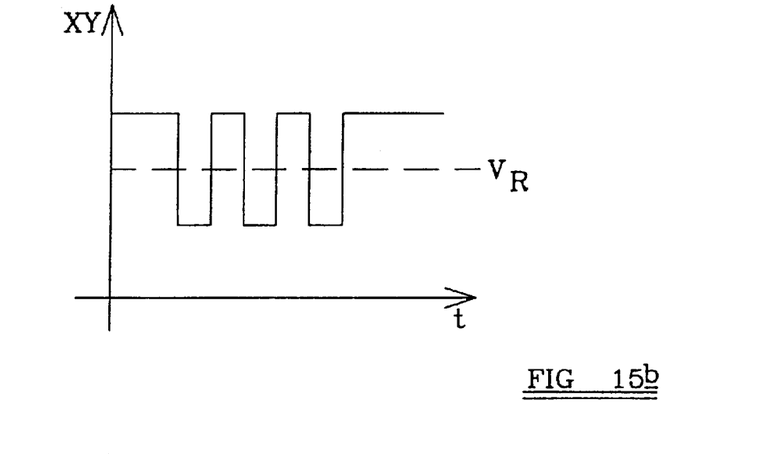

FIG. 13 shows a further RF transponder embodying the present invention in which the demodulated signal from the modem circuit 16 is combined with the rectified signal from the rectifier circuit 19. This "combined" signal has the effect of adding the rectified voltage $V_R$ to the average modulated voltage $V_M$. FIG. 14 shows in detail a circuit used to obtain this combined voltage. In the configuration of FIG. 14, the third and fourth microwave diodes 23, 24 are in reverse polarity. Thus, both the DCR capacitor 37 and the third capacitor 27 will have the same polarity in terms of voltage. This will give a series combination of the voltages of the DCR capacitor 37 and the third capacity 27. The resultant waveform across XY is a superposition of rectified and demodulated signals in which the demodulated signal sits on the rectified signal with a DC offset of $V_R$ as shown in FIG. 15B. This waveform has the same pattern as the waveform $V_M$ in the example described with FIG. 11, but has sufficient magnitude to be read directly by the digital circuits that reside in the baseband processor, thus obviating the need for comparators to boost the waveform. Using this technique of combining the rectified and demodulated signals improves the performance of the transponder by increasing the effective range over which the transponder will operate and reduces the number of components required and hence the power consumption of the transponder. The ability of the modem to eliminate the need for comparators not only saves on space but also reduces substantially the overall power consumption of the system, comparators drawing considerable power.

Figure 15C:
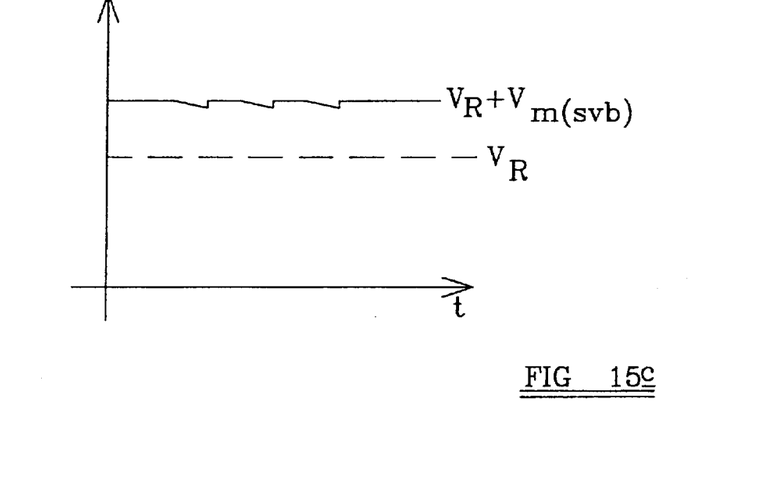

Referring again to FIG. 14, a fifth diode 35 is included to provide further rectification. A fifth capacitor 36 represents a DC storage capacitor connected across the second and third terminals 33, 34. FIG. 15C shows the output waveform of the boosted rectified voltage across X'Y.

In summary, in the circuitry of FIGS. 10, 11, 13 and 14, the output of the modem 16 is the demodulated data (the voltage across YZ). In the circuitry of FIGS. 10 and 11, the voltage across YZ represents modulated data to be backscattered to the reader 1, and the output of the rectifier 19 is the power supply for the transponder (the voltage across XZ), in the circuitry of FIGS. 13 and 14 either the voltage across XY or that across YZ may represent the data to be backscattered to the reader 1, and the smoothed combined outputs of the modem 16 and the rectifier 19 is the power supply for the transponder (the voltage across X'Y).

Figure 16A:
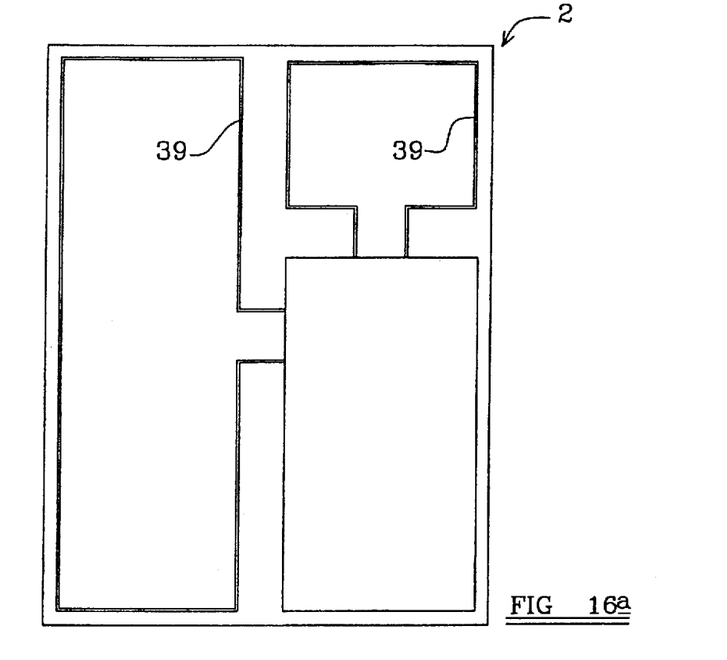
FIGS. 16a–16b shows examples of some of the possible antenna configurations that, incorporating the above, embody the present invention.
Figure 16B:
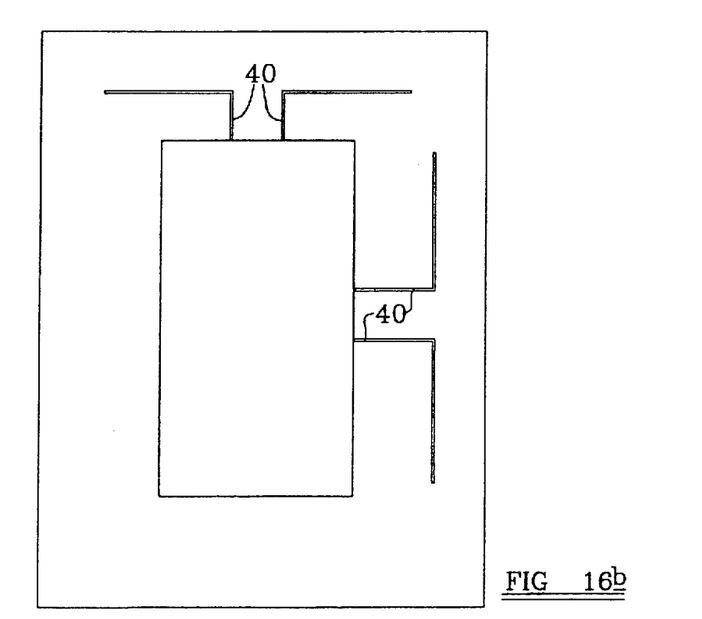

The rectifier circuits of FIGS. 11 and 14 may be used with other configurations of antennae, such as the antenna configurations presented in FIGS. 16A and 16B. It is preferred to have two loop antennae 39 or two dipole antennae 40 oriented at approximately 90° to one another.

The above two rectifying circuits are especially suited for use on RF transponders embodying the present invention since the combined area occupied by the dual port antenna and the rectifying circuit is small compared to other designs which do not embody the invention. Further, the above described rectifying circuits can be used with the antenna configurations shown in FIGS. 16a and 16b to minimise transponder size.

Although the above embodiments describe a transponder which derives its power from a radiated signal, it is envisaged that the rectifying circuit of the present invention would also be extremely useful on a transponder which has a built-in power source, for example a small battery mounted on the transponder.

In addition, it should be noted that whilst the majority of the description of the transponder is directed to its operation when in a receiving mode, the transponder is also operable in a transmitting mode. Operation in the transmitting mode is clearly apparent to a person skilled in this technical field.

What is claimed is:

1. An RF transponder having an antenna, the antenna comprising at least two ports operable to receive signals such that, in use, the signals in combination establish at least two current nulls on the antenna, each of the ports being located substantially at a current null.

2. An RF transponder according to claim 1, wherein the antenna is a loop antenna.

3. An RF transponder according to claim 2, wherein the loop antenna is formed as a coplanar structure.

4. An RF transponder according to claim 2, wherein the loop antenna is a rectangular loop.

5. An RF transponder according to claim 1, wherein the number of current nulls is two.

6. An RF transponder according to claim 1 wherein the length of the perimeter of the antenna is substantially equal at least two half wavelengths of at least one of the signals.

7. An RF transponder according to claim 1 wherein, the signals are 90° out of phase with each other.

8. An RF transponder according to claim 1 wherein a coplanar stripline is provided for feeding the signals to the antenna.

9. An RF transponder according to claim 1, wherein the number of ports is two.

10. A rectifying circuit containing two ports, each port being operable to have an oscillating voltage applied thereacross by a signal, a first rectifier being connected to the first port and being constructed such that, in operation, the output of the first rectifier is substantially constant, and a second rectifier being connected to the second port and being constructed such that, in operation, the output of the second rectifier fluctuates in phase with the applied oscillating voltage.

11. A circuit according to claim 10, wherein the rectifier has an output comprising the outputs of the first and second rectifier combined with one another.

12. A circuit according to claim 11, wherein the combined output of the first and second rectifier is of sufficient magnitude to be read directly by conventional digital circuits without being amplified.

13. A circuit according to claim 11, wherein the outputs of the first and second rectifier arc combined by summation.

14. A circuit according to claim 11, wherein the combined output is bridged by a DC storage capacitor to provide a DC power source.

15. A circuit according to claim 10, wherein the first rectifier performs a voltage multiplication effect.

16. A circuit according to claim 10, wherein the second rectifier performs a voltage multiplication effect.

17. A circuit according to claim 10, wherein the first rectifier comprises first and second diodes and first and second capacitors, the capacitance of the second capacitor being sufficiently large to provide a smoothing effect that, in operation, renders the output of the first rectifier approximately constant.

18. A circuit according to claim 10, wherein the second rectifier comprises third and fourth diodes and third and fourth capacitors, the capacitance of the fourth capacitor being sufficiently small that, in operation, the output of the second rectifier fluctuates in phase with the applied oscillating voltage.

19. An RF transponder including a rectifying circuit according to claim 10, wherein the combined output of the first and second rectifiers comprises a demodulated signal for the transponder and the output is Anther bridged by a DC storage capacitor to provide a DC power source for the transponder.

20. An RF transponder having an antenna, the antenna comprising at least two ports operable to receive signals such that, in use, the signals in combination establish at least two current nulls on the antenna, each of the ports being located substantially at current null, the transponder further comprising a rectifying circuit containing two ports, each port being operable to have an oscillating voltage applied there across by a signal, the first rectifier being connected to the first port and being constructed such that, in operation, the output of the first rectifier is substantially constant, and the second rectifier being connected to the second port and being constructed such that, in operation, the output of the second rectifier fluctuates in phase with the applied oscillating voltage.

21. An RF transponder according to claim 20, in combination with two dipole antennae.

* * * * *